United States Patent
Teisseyre et al.

(10) Patent No.: US 11,895,393 B1
(45) Date of Patent: Feb. 6, 2024

(54) USE OF INTERMEDIATE FRAMES TO CAPTURE AND ADJUST LOW FRAME-RATE, SINGLE-LIGHT SOURCE IMAGES

(71) Applicant: Verily Life Sciences LLC, South San Francisco, CA (US)

(72) Inventors: Thomas Teisseyre, Montara, CA (US); David Freese, Mountain View, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

(21) Appl. No.: 17/825,506

(22) Filed: May 26, 2022

Related U.S. Application Data (60) Provisional application No. 63/213,875, filed on Jun. 23, 2021.

(51) Int. Cl.
 *H04N 23/62* (2023.01)
 *H04N 5/265* (2006.01)
 *H04N 23/56* (2023.01)

(52) U.S. Cl.
 CPC ............. *H04N 23/62* (2023.01); *H04N 5/265* (2013.01); *H04N 23/56* (2023.01)

(58) Field of Classification Search
 None
 See application file for complete search history.

(56) References Cited

U.S. PATENT DOCUMENTS

| | | | |
|---|---|---|---|
| 7,787,121 B2 | 8/2010 | Tsujita et al. | |
| 8,498,695 B2 | 7/2013 | Westwick et al. | |
| 2011/0249911 A1* | 10/2011 | Determan | G06V 20/695 |
| | | | 382/282 |
| 2016/0344910 A1* | 11/2016 | Shen | G06V 10/255 |
| 2019/0110856 A1* | 4/2019 | Barral | G16H 30/40 |

FOREIGN PATENT DOCUMENTS

| | | |
|---|---|---|
| WO | 2009022003 A1 | 2/2009 |
| WO | 2009117483 A1 | 9/2009 |

* cited by examiner

*Primary Examiner* — Eileen M Adams
(74) *Attorney, Agent, or Firm* — Christensen O'Connor Johnson Kindness (57) ABSTRACT

Systems, methods, and non-transitory, machine-readable storage media for imaging a scene are described. In an embodiment, the method includes repeatedly illuminating a scene with illumination light from a plurality of light sources; generating video feed of the scene based on the scene illuminated by the illumination light; illuminating the scene with only individual light sources of the plurality of light sources between illuminating the scene with the plurality of light sources; generating a composite image of the scene based on the scene illuminated by only the individual light sources; and adjusting the composite image based upon input received from the user interface.

18 Claims, 3 Drawing Sheets

USE OF INTERMEDIATE FRAMES TO CAPTURE AND ADJUST LOW FRAME-RATE, SINGLE-LIGHT SOURCE IMAGES

CROSS-REFERENCE TO RELATED APPLICATION

This application claims the benefit of U.S. Provisional Application No. 63/213,875, filed Jun. 23, 2021, which is hereby incorporated by reference in its entirety.

TECHNICAL FIELD

The present disclosure generally relates to adjusting an image captured by an imaging system and, in particular but not exclusively, relates to adjusting an image captured by an endoscopic imaging system

BACKGROUND INFORMATION

Laser-based illumination and other forms of hyperspectral imaging provide the ability to precisely control the intensity and timing of a select set of wavelengths illuminating a scene, such as a surgical scene. However, what wavelengths should be used, and the intensity at which they should be mixed to produce both an appealing and useful image is an open problem. Determining acceptable mixtures of wavelengths and light source intensities generally includes time and effort from users, such as surgeons, and engineers designing imaging systems.

User feedback can be helpful in understanding how a scene should be illuminated. If there was a way that users could view the same illuminated scene while being able to configure the lighting parameters of the imaging systems, then users could customize the illumination profile to their preferences and new tasks before ever using the system.

BRIEF DESCRIPTION OF THE DRAWINGS

Non-limiting and non-exhaustive embodiments of the claimed subject matter are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an imaging system; a non-transitory, machine-readable storage medium; and method for imaging and adjusting images of a scene are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Light engines including a number of light sources, such as those configured to emit light of different wavelengths, can be suitable to emit combined light onto a scene, such as to emit combined light configured to be visually perceived by a user as white light or other continuous light. Likewise, such a light engine can be used to emit light from only a subset of light sources in the light engine, such as with only a single light source of the light engine.

As set forth in greater detail below, the present disclosure provides an imaging system; a non-transitory, machine-readable storage medium; and a method for illuminating a scene with a plurality of light sources of a light engine to generate a video feed and, alternatingly, only one or subsets of the light sources of the light engine to generate a combined image, which may be adjusted by a user to suit their preferences. Such adjustability allows the user, for example, to increase contrast or visibility of portions or features of a scene.

Figure 1:
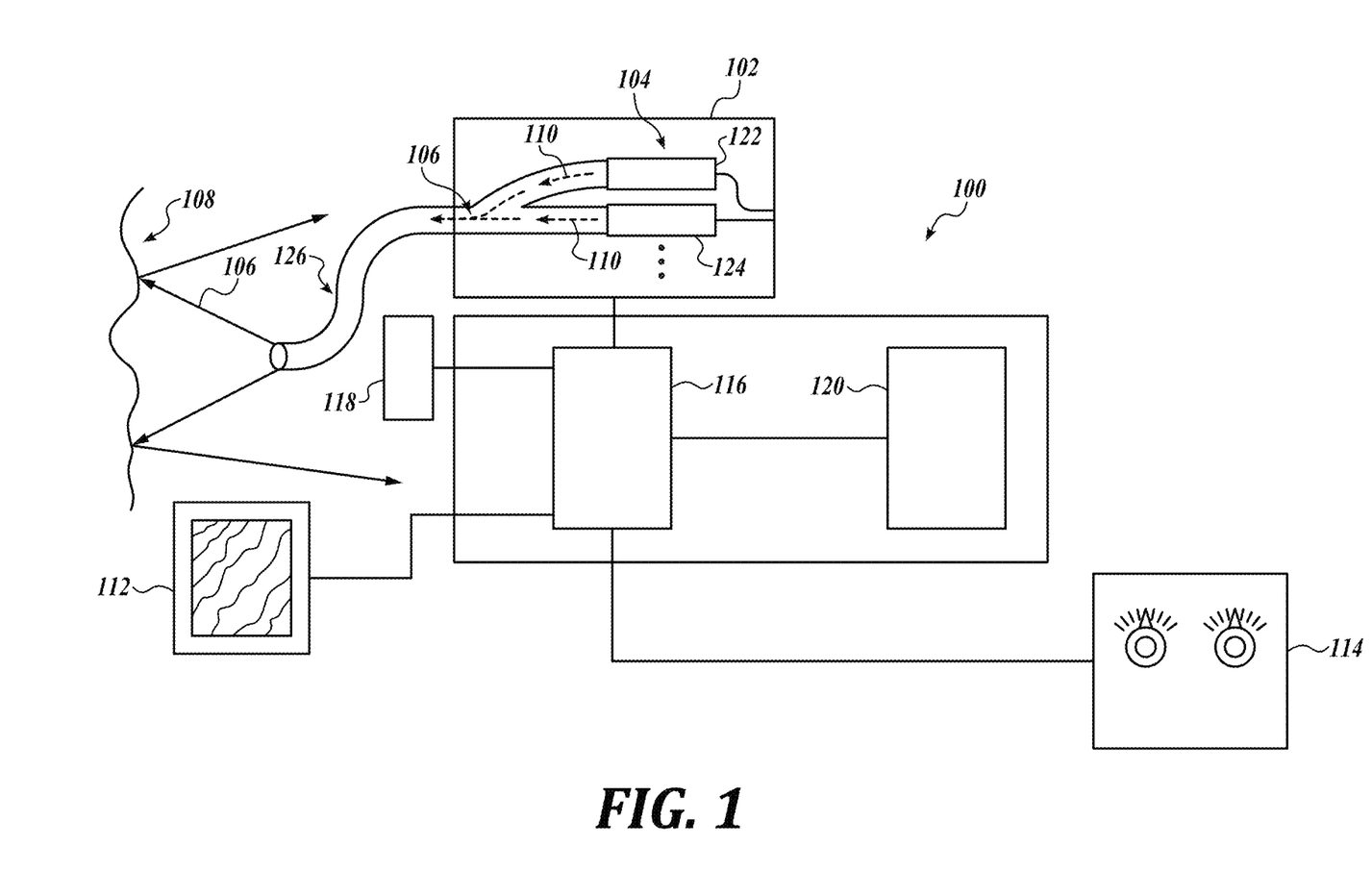
FIG. 1 is schematic illustration of a system, in accordance with an embodiment of the present disclosure.

In this regard, attention is directed to FIG. 1 in which a system 100, according to an embodiment of the present disclosure, is schematically illustrated. In the illustrated embodiment, the system 100 is shown to include a light engine 102 comprising a plurality of light sources 104; a display 112; a user interface 114 configured to receive input from a user; and a controller 116 operatively coupled to the light engine 102, the display 112, and the user interface 114.

The system 100 is shown to further include a photodetector 118 positioned to receive light reflected off of the scene 108. In an embodiment, the photodetector 118 is configured to generate one or more signals based on light received from the scene 108. In an embodiment, the one or more signals generated by the photodetector 118 are based upon the wavelength and intensity of light received by the photodetector 118 from the scene 104. Such one or more signals are in contrast to a signal sent by the photodetector 118 to the controller 116 to indicate that, for example, the photodetector 118 is integrating to initiate light emission from the light engine 102.

As shown, the photodetector 118 is also operatively coupled to the controller 116, such as to send signals to the controller 116 for generating images based on the light received from the scene 108. In an embodiment, the photodetector 118 is responsive to and configured to generate a signal based on visible light. In an embodiment, the photodetector 118 is not responsive to and not configured to generate a signal based on light outside of the visible range, such as light in the infrared range (e.g. in a range of about 700 nm to about 1 mm in wavelength).

As shown, the light engine 102 includes two or more individual light sources 122 and 124 each configured to emit isolated light 110 onto a scene 108. In the illustrated embodiment, the system 100 further includes an endoscope 126 coupled to and configured to receive from the light engine 102 and shaped to illuminate the scene 108 with the illumination light 106. In this regard, each of the individual light sources, including a first individual light source 122 and a second individual light source 124, are optically coupled to the endoscope 126 to emit light therethrough and onto the scene 108.

In an embodiment, the light sources of the plurality of light sources 104 are configured to emit isolated light 110 of different wavelength ranges. In this regard, in an embodiment, the first individual light source 122 is configured to emit light in a first wavelength range, and the second individual light source 124 is configured to emit light in a second wavelength range different from the first wavelength range. In an embodiment, the first wavelength range overlaps with the second wavelength range. In an embodiment, the first wavelength range does not overlap with the second wavelength range. In an embodiment, the light sources of the plurality of light sources 104 are configured to emit visible light, such as light within a wavelength range of about 400 nm to about 700 nm. In an embodiment, the light sources of the plurality of light sources 104 are not configured to emit light outside of the visible range.

In an embodiment, the light sources of the plurality of light sources 104 are configured to be quickly switched on and off. As discussed further herein, such a capability is suitable to alternatingly illuminate a scene 108 with all of the light sources of the plurality of light sources 104 in a first time interval and only one or a subset of the light sources of the plurality of light sources 104 in a second time interval separate from the first time interval. In an embodiment, the plurality of light sources 104 includes one or more lasers. In an embodiment, the plurality of light sources 104 includes one or more light-emitting diodes (LEDs).

As above, the system 100 includes a controller 116 operatively coupled to the light engine 102. In an embodiment, the controller 116 includes logic to choreograph operation of components of the system 100 operatively coupled thereto.

In an embodiment, the controller 116 includes logic that, when executed by the system 100, causes the system 100 to perform operations. In an embodiment, such operation includes one or more methods of the present disclosure. In an embodiment, such operations include repeatedly illuminating the scene 108 with the illumination light 106 from the plurality of light sources 104; and illuminating the scene 108 with only individual light sources of the plurality of light sources 104 between illuminating the scene 108 with the plurality of light sources 104.

Figure 2:
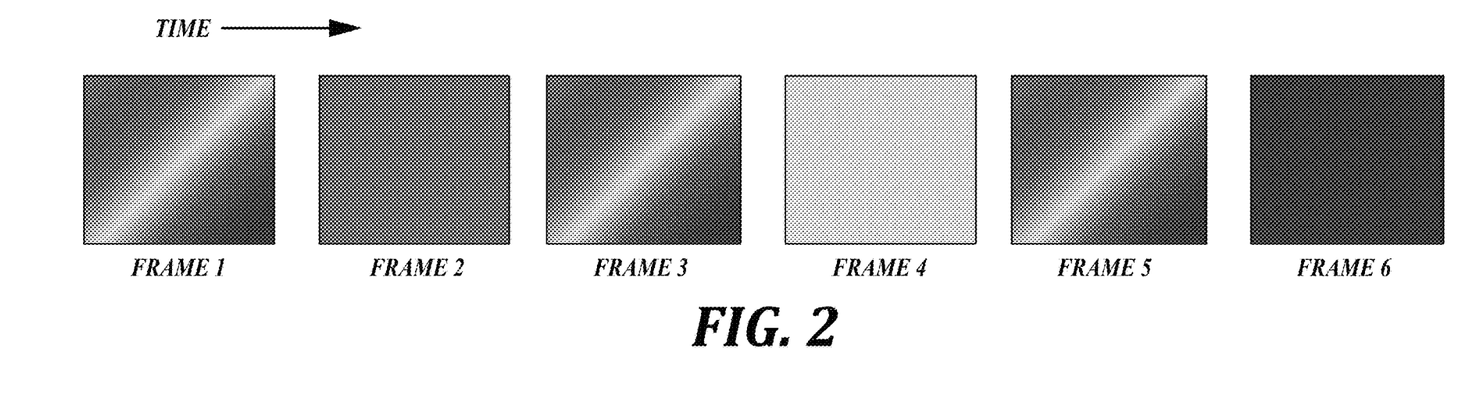
FIG. 2 is an illustration of sequential image frames obtained by a system, in accordance with an embodiment of the present disclosure.

In that regard, attention is directed to FIG. 2, which schematically illustrates a scene 108 illuminated by the system 100, in accordance with the present disclosure. As shown, the scene 108 is repeatedly illuminated with illumination light 106 from each light source of a light engine 102, as in frames 1, 3, and 5. Interleaved between illuminating the scene 108 with each light source of the plurality of light sources 104, the system 100 illuminates the scene 108 with only individual light sources of the plurality of light sources 104, as in frames 2, 4, and 6. In the illustrated embodiment, the system 100 alternates between illuminating the scene 108 with only a first individual light source 122 as in frame 2, illuminating the scene 108 with each light source of the light engine 102 as in frame 3, and illuminating the scene 108 with only a second individual light source 124 as in frame 4. While three light sources are shown illuminating the scene 108, it will be understood that the concepts illustrated in FIG. 2 can be extended to a light engine containing any number of light sources.

In an embodiment, an intensity of light output from the individual light sources is greater when illuminating the scene 108 with only one of the individual light sources compared an intensity of light output from the individual light sources when illuminating the scene 108 with each of the plurality of light sources 104. As discussed further herein, scene signals generated by the photodetector 118 and based upon the scene 108 illuminated with only one or a subset of individual light sources are used to generate a composite image. By increasing an intensity of light output from the individual light sources when illuminating the scene 108 with only one of the individual light sources of the plurality of light sources 104, a signal-to-noise ratio can be increased, thus improving composite image quality.

In an embodiment, the controller 116 includes logic that, when executed by the system 100, causes the system 100 to perform operations including generating video feed of the scene 108 with the display 112 based on the scene 108 illuminated by the illumination light 106 from the plurality of light sources 104. Such a video feed can be a live video feed of the scene 108 illuminated by the illumination light 106 of the light engine 102. In an embodiment, generating the video feed includes correlating signals generated by the photodetector 118 based on the scene 108 illuminated by the plurality of light sources 104 and a time when those signals were generated. In an embodiment, the system 100 generates a time stamp or other signal indicating a time associated with generating a signal with the photodetector 118, which can be used in correlating such signals in time.

Figure 3:
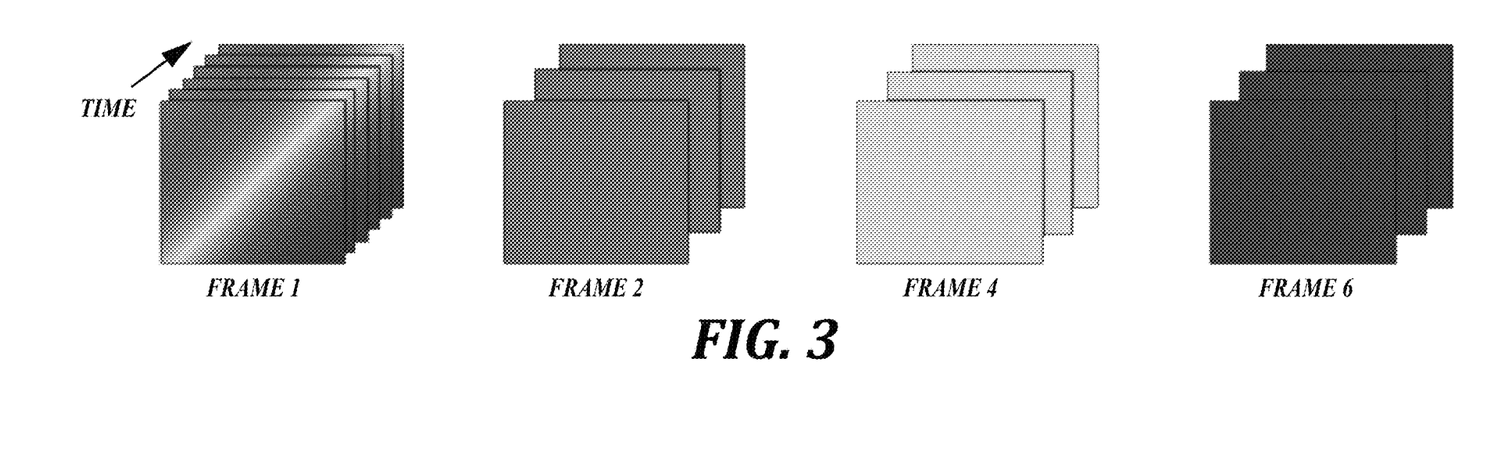
FIG. 3 is an illustration of image frames from FIG. 2 grouped according to light sources used to illuminate a scene, in accordance with an embodiment of the present disclosure.

As above, the system 100 is configured to alternatingly illuminate the scene 108 with each of the light sources and only one or a subset of the plurality of light sources 104. In order to generate of video feed based on the scene 108 illuminated by the plurality of light sources 104, the system 100 can select those signals generated by the photodetector 118 that are based upon the scene 108 illuminated by each of the plurality of light sources 104 and sequentially concatenate them to generate the video feed. Such a selected sequential concatenation is schematically illustrated in FIG. 3, where frames based on the scene 108 illuminated by the plurality of light sources 104 are selected and ordered sequentially.

In an embodiment, generating the video feed includes generating scene signals with the photodetector 118 at an imaging frame rate. In an embodiment, the imaging frame rate is greater than or equal to a display frame rate of the display 112. In an embodiment, the imaging frame rate used to generate the video feed matches the display frame rate, where the photodetector 118 is configured to generate signals based on the scene 108 a frame rate faster than the imaging frame rate. In this regard, the photodetector 118 can generate additional signals based on the scene 108 illuminated by the light engine 102, such as in between or interleaved between frames used to generate signals based on the scene 108 individually illuminated by each of the plurality of light sources 104. In an embodiment, the display 112 has a frame rate of, for example, 30 Hz and the photodetector 118 has a frame rate of 120 Hz. As above, the light engine 102 can be used to illuminate the scene 108 with each of the light sources of the plurality of light sources 104 at 30 Hz to match the display rate of the display 112. This leaves 90 frames/sec of the photodetector 118 to generate signals based on the scene 108 illuminated by individual light sources. As shown in FIG. 2, such frames can be obtained interleaved between frames in which the scene 104 is illuminated by the plurality of light sources 104.

While the system 100 is shown to include a display 112, in an embodiment the display 112 is optional. In an embodiment, the system 100 is configured to transmit signals to a display not included in the system 100.

As above, in an embodiment, the controller 116 includes logic that, when executed by the system 100, causes the system 100 to perform operations including illuminating the scene 108 with only one of the individual light sources 122 and 124 of the plurality of light sources 104 between illuminating the scene 108 with each of the plurality of light sources 104.

In an embodiment, the controller 116 includes further logic that, when executed by the system 100, causes the system 100 to perform operations including generating a composite image of the scene 108 with the display 112 based on the scene 108 illuminated by the individual light sources 122 and 124. Accordingly, in an embodiment, the controller 116, operatively coupled to the photodetector 118, includes logic that, when executed by the controller 116, causes the system 100 to perform operations including generating a first isolated scene signal with the photodetector 118 based upon the scene 108 illuminated only by the first individual light source 122; and generating a second isolated scene signal with the photodetector 118 based upon the scene 108 illuminated only by the second individual light source 124. Such first and second isolated scene signals can be sent to and saved in data storage 120 operatively coupled to controller 116, such as for further manipulation by a user with the user interface 114.

In an embodiment, the controller 116 includes logic that, when executed by the controller 116, causes the system 100 to perform operations including: generating a composite scene signal based upon the first isolated scene signal and the second isolated scene signal; and generating the composite image with the display 112 based upon the composite scene signal. In an embodiment, the composite image is based the scene 108 separately illuminated by two, three, four, five, or more individual light sources of the light engine 102.

As shown in FIG. 2, in certain embodiments, the system 100 is configured to repeatedly illuminate the scene 108 with one or a subset of light sources of the plurality of light sources 104 in between frames in which the scene 108 is illuminated with each light source of the light engine 102. In this regard, the system 100 can be used to generate video feeds based upon the scene 108 illuminated with only one or a subset of the plurality of light sources 104. Accordingly, in an embodiment, illuminating the scene 108 with only the first individual light source 122 includes repeatedly illuminating the scene 108 with only the first individual light source 122, and illuminating the scene 108 with only the second individual light source 124 includes repeatedly illuminating the scene 108 with only the second individual light source 124. Likewise, in an embodiment, the controller 116 includes logic that, when executed by the controller 116, causes the system 100 to perform operations including: generating a composite video feed of the scene 108 based on composite images of the scene 108 illuminated by the first individual light source 122 and the second individual light source 124. As shown in FIG. 3, image frames generated from illuminating the scene 108 only with one of the individual light sources of the light engine 102 can be sequentially concatenated together, such as to form individual light source video feeds.

As above, the system 100 includes a user interface 114 configured to receive input from a user. Such a user interface 114 can be configured to receive input indicative of one or more imaging metrics. In an embodiment, such metrics include image contrast, image brightness, and the like.

The user interface 114 can be used to adjust the composite image. In an embodiment, adjusting the composite image includes adjusting a relative proportion of the first isolated scene signal compared to the second isolated scene signal. By adjusting relative proportions of isolated scene signals, a user can adjust a color of the composite image. In this regard, a user can highlight certain features within the scene 108 that are, for example, better visualized by one or a subset of individual light sources of the plurality of light sources 104.

In an embodiment, a user can adjust the composite image or composite video feed after imaging the scene 108, such as in post-processing of the images generated based upon the scene 108. In an embodiment where the system 100 includes the endoscope 126, a portion of the body can be imaged where user guides the endoscope 126 through the body generating scene signals. After generating the scene signals, a user can adjust the composite images using the user interface 114 to create adjusted composite images. In an embodiment, a user can adjust the composite image in real time using the user interface 114.

In the illustrated embodiment, the user interface 114 includes a number of dials configured to be rotated by a user to adjust the composite image. While physical dials are illustrated, it will be understood that other structures suitable to receive input from a user, such as a touch screen, a keyboard, a mouse, a click ball, and the like, are possible and within the scope of the present disclosure. In an embodiment, the user interface 114 takes the form of a computer, a tablet, a smart phone, or the like, operatively coupled to or including the controller 116.

In another aspect, the present disclosure provides methods for imaging a scene and adjusting images of the scene. In an embodiment, the method is a method for using one or more of the systems of the present disclosure, such as system 100. In an embodiment, the method includes repeatedly illuminating a scene with illumination light from a plurality of light sources; generating a video feed of the scene with a display based on the scene illuminated by the illumination light; illuminating the scene with only individual light sources of the plurality of light sources between illuminating the scene with the plurality of light sources; generating a composite image of the scene with the display based on the scene illuminated by only the individual light sources; and adjusting the composite image based upon input received from the user interface.

Figure 4:
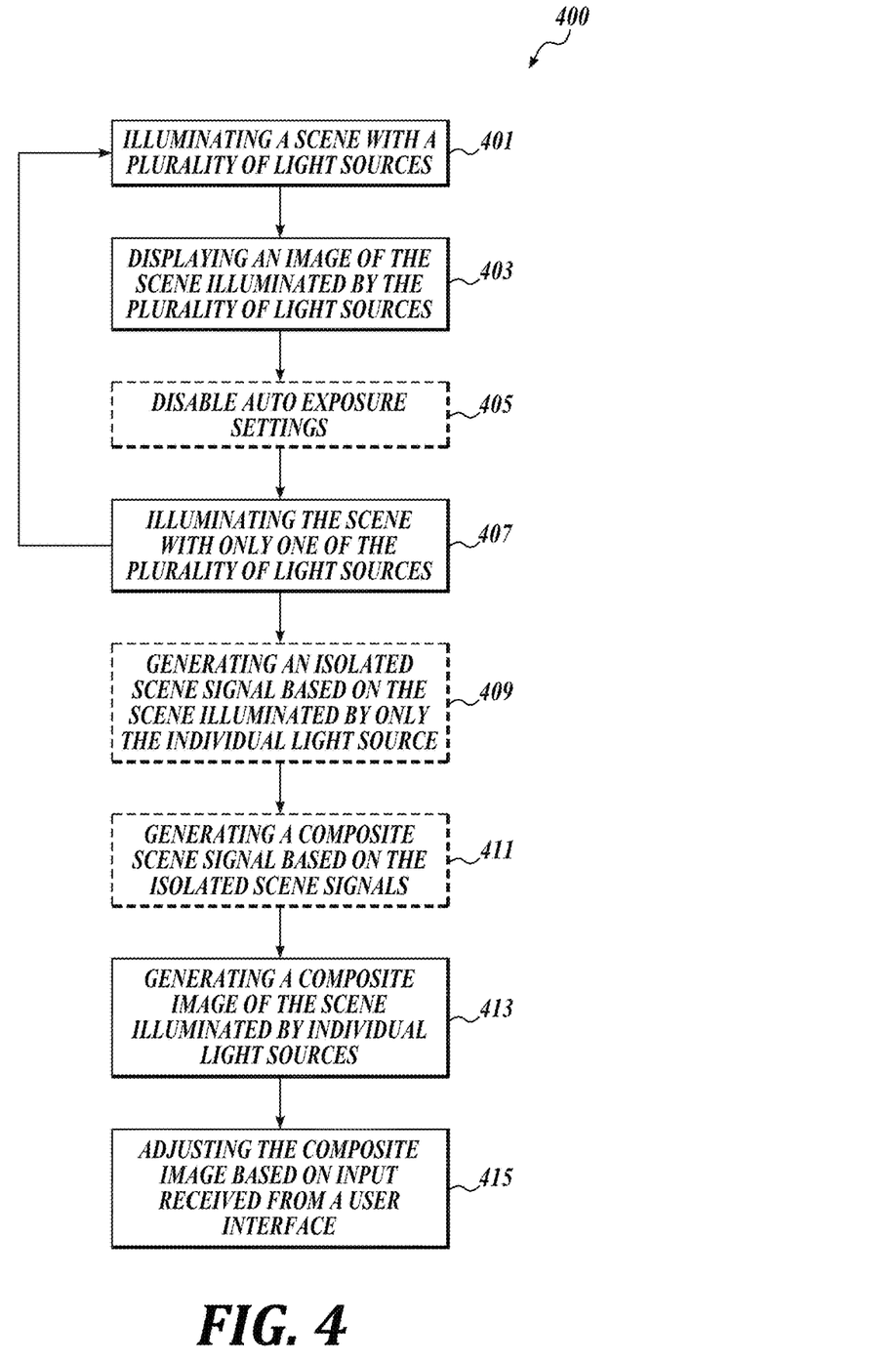
FIG. 4 is a block diagram illustrating a method, in accordance with an embodiment of the present disclosure.

An embodiment of the method of the present disclosure is illustrated in FIG. 4. In an embodiment, the method 400 begins with process block 401, which includes illuminating a scene with a plurality of light sources. In an embodiment, the plurality of light sources is an example of the plurality of light sources 104 of the light engine 102. In an embodiment, illuminating the scene with the plurality of light sources includes repeatedly illuminating the scene with the plurality of light sources, such as at a frame rate.

In an embodiment, the plurality of light sources includes a first individual light source and a second individual light source. In an embodiment, illumination light from the plurality of light sources, such as including the first individual light source and the second individual light source, is configured to be perceived as white light or light from another broad spectrum light source, such as an incandescent light source. In an embodiment, the first individual light source is configured to emit light in a first wavelength range, and the second individual light source is configured to emit light in a second wavelength range different from the first wavelength range. In an embodiment, the combined light from the first light source and second light source is configured to be visually perceived, such as through images generated by a display, as continuous light.

In an embodiment, illumination light from the plurality of light sources includes visible light. In an embodiment, the illumination light does not include light outside of the visible range.

In an embodiment, the scene is a surgical scene. In an embodiment, illuminating the scene with the plurality of light sources includes emitting the illumination light from the plurality of light sources through an endoscope optically coupled to the plurality of light sources and onto the scene.

In an embodiment, process block 401 is followed by process block 403, which includes displaying an image of the scene illuminated by the plurality of light sources. In an embodiment, process block 401 includes generating a scene signal with a photodetector based on the scene illuminated by the plurality of light sources, wherein the image of the scene illuminated by the plurality of light sources is based upon the scene signal. In an embodiment, the display is positioned or otherwise configured to be viewed by a user, such as a user guiding the endoscope.

In an embodiment, process block 403 is followed by process block 405, which includes disabling any auto-exposure settings. As discussed further herein with respect to process block 407, the method 400 further includes illuminating the scene with individual light sources, which may be later manipulated or adjusted, such as based upon user input. By disabling auto-exposure settings, the scene may be imaged with only individual light sources without prior manipulation by the system. In this regard, images generated based on illumination with only individual light sources are less processed and may be manipulated by a user more widely. In an embodiment, process block 405 is optional.

In an embodiment, process blocks 403 or 405 is/are followed by process block 407, which includes illuminating the scene with only individual light sources of the plurality of light sources. As used herein, illuminating a scene with only individual light sources refers to illuminating a scene with only one light source. This is in contrast to illuminating the scene with two or more light sources of a plurality of light sources.

In an embodiment, an intensity of light output from the individual light sources is greater when illuminating the scene with only the individual light sources compared to an intensity of light output from the individual light sources when illuminating the scene with the plurality of light sources. By increasing an illumination intensity from the individual light sources when illuminating the scene individually, a signal-to-noise ratio generated by the photodetector in response to individual illumination can be increased. As discussed further herein, signals based on individual illumination can be used to generate composite images, which are later manipulated or adjusted by a user. By increasing a signal-to-noise ratio, the composite image can be improved and provide a greater range of possible adjustments for the user.

In an embodiment, process block 407 is followed by process block 409, which includes generating an isolated scene signal, such as with a photodetector, based upon the scene illuminated only by the individual light source. In an embodiment process block 409 is optional.

As shown, in an embodiment, the method can revert to process block 401 after process block 407. In this regard, the method includes repeatedly illuminating a scene with illumination light from a plurality of light sources. Correspondingly, in an embodiment, displaying an image of the scene illuminated by the plurality of light sources, such as in process block 403, can take the form of generating video feed of the scene with a display based on the scene illuminated by the illumination light.

Additionally, as shown when process blocks 401-407 are repeated, illuminating the scene with only one light source of the plurality of light sources is temporally between illuminating the scene with all of the plurality of light sources. See also FIG. 2. In this regard, the method alternates between illuminating the scene with all of the plurality of light sources and only one of a plurality of light sources.

As above, in certain embodiments, the method includes generating a video feed of the scene with the display based on the scene illuminated by the illumination light from the plurality of light sources. In an embodiment, generating the video feed includes illuminating the scene at an imaging frame rate. In an embodiment, the imaging frame rate matches a display frame rate of the display. In an embodiment, the imaging frame rate is less than a frame rate of the photodetector, which allows frames not used in display imaging to be used to image the scene illuminated by individual light sources.

In certain embodiments, as the method iterates between process blocks 401-407, process block 407 can include illuminating the scene with different or alternating individual light sources. In this regard, in certain embodiments, illuminating the scene with only individual light sources includes: illuminating the scene with only a first individual light source of the plurality of light sources; and later illuminating the scene with only a second individual light source of the plurality of light sources. By illuminating the scene with different individual light sources, such as different individual light sources emitting light of different wavelength ranges, certain aspects of the scene can be better imaged under the individual illumination than, for example, under illumination from the plurality of light sources, particularly as composite images are generated and adjusted, as discussed further herein with respect to process blocks 413 and 415.

Correspondingly, in an embodiment, in process block 409 including generating an isolated scene signal based on the scene illuminated by only the individual light sources includes generating a first isolated scene signal with the photodetector based upon the scene illuminated only by the first individual light source; and generating a second isolated scene signal with the photodetector based upon the scene illuminated only by the second individual light source.

As noted above, the method 400 can include repeating process blocks 401-407 a number of times. Accordingly, in an embodiment, illuminating the scene with only the first individual light source includes repeatedly illuminating the scene with only the first individual light source, and illuminating the scene with only the second individual light source includes repeatedly illuminating the scene with only the second individual light source. Such repeated individual illumination can be used for generating a composite video feed, such as a composite video feed of the scene based on composite images of the scene illuminated by the first individual light source and separately the second individual light source, as discussed further herein with respect to process block 413.

In an embodiment, process block 409 is followed by process block 411, which includes generating a composite scene signal based upon the isolated scene signal(s). Such composite scene signals can be a superposition or sum of isolated scene signals generated in process block 409. In an embodiment, process block 411 includes generating a composite scene signal based upon the first isolated scene signal and the second isolated scene signal. In an embodiment, process block 411 is optional.

In an embodiment, process blocks 407, 409, or 411 are followed by process block 413, which includes generating an image of the scene illuminated by individual light source(s). In an embodiment, the image is a composite image of the scene illuminated, such as separately illuminated, by the individual light sources. In an embodiment, generating the composite image includes generating the composite image with the display based upon the composite scene signal generated in process block 411.

As above, process block 407, including illuminating the scene with individual light source(s), can be repeated a number of times. Accordingly, in an embodiment, process block 413 can include generating a composite video feed of the scene based on composite images of the scene, such as of the scene illuminated by the first individual light source and the second individual light source.

In an embodiment, process block 413 is followed by process block 415, which includes adjusting the composite image based upon input received from the user interface. In an embodiment, adjusting the composite image includes adjusting a relative proportion of scene signals generated by a photodetector based on the scene illuminated by individual light sources.

In an embodiment, adjusting the composite image is based upon one or more signals received, such as received by a controller of a system, from a user interface. As described further herein with respect to system 100, a user interface, such as user interface 114, can be configured to receive an input from a user indicative of a change to be made to a composite image. In an embodiment, the user interface generates a signal, such as a signal for receipt by the controller, such as controller 116, based upon the user interface, which is used to adjust the composite image.

In an embodiment, adjusting the composite image includes adjusting a relative proportion of the first isolated scene signal compared to the second isolated scene signal. Adjusting a relative proportion of the scene signals can, for example, highlight or heighten the visibility of certain aspects or features within the field of view of the imaged scene. For example, in an embodiment, a blood vessel within the scene may be more visible when viewed under a greater proportion of blue light than red light. By increasing a relative proportion of scene signals generated under blue light illumination relative to red light illumination, blood vessels in the scene can be more easily seen.

In an embodiment, the relative proportions of the scene signals are saved in the system, such as with data storage. These relative proportions can be later used to inform the relative intensities of light sources used to illuminate a scene. In this regard, the user-defined relative intensities of the scene signals can be later used to define or influence the relative intensities of the plurality of light sources in a light engine used to illuminate a scene, such as without further input from the user.

Adjusting the composite image can further include adjusting one or more image metrics, such as image contrast, image brightness, and the like, to adjust the image.

In an embodiment, adjusting the composite image is performed as the scene is being imaged. In this regard, in an embodiment, the composite image is adjusted in real time or in near real time. In an embodiment, adjusting the composite image is performed after the scene has been imaged. In such an embodiment, the composite image is adjusted in post-processing of the image.

The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

Some processes explained above are described in terms of computer software and hardware. The techniques described may constitute machine-executable instructions embodied within a tangible or non-transitory machine (e.g., computer) readable storage medium, that when executed by a machine will cause the machine to perform the operations described. In an aspect, the present disclosure provides non-transitory, machine-readable storage media for performing one or more methods of the present disclosure, such as with one or more of the systems of the present disclosure. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A system comprising:
a plurality of light sources configured to emit illumination light onto a scene, wherein each individual light source of the plurality of light sources is configured to emit isolated light of a different wavelength range; and
a controller operatively coupled to the plurality of light sources, the controller including logic that, when executed by the system, causes the system to perform operations including:

repeatedly illuminating the scene with the illumination light from the plurality of light sources;
generating a video feed of the scene based on the scene illuminated by the illumination light;
illuminating the scene with only a first individual light source of the plurality of light sources between illuminating the scene with the plurality of light sources;
illuminating the scene with only a second individual light source of the plurality of light sources between illuminating the scene with the plurality of light sources;
generating a composite image of the scene based on the scene illuminated by only the first individual light source and the scene illuminated by only the second individual light source; and
adjusting the composite image based upon user input.

2. The system of claim 1, further comprising a photodetector configured to generate a signal based upon light received from the scene;
wherein the controller includes logic that, when executed by the controller, causes the system to perform operations including:
generating a first isolated scene signal with the photodetector based upon the scene illuminated only by the first individual light source;
generating a second isolated scene signal with the photodetector based upon the scene illuminated only by the second individual light source;
generating a composite scene signal based upon the first isolated scene signal and the second isolated scene signal; and
generating the composite image based upon the composite scene signal.

3. The system of claim 2, wherein adjusting the composite image includes adjusting a relative proportion of the first isolated scene signal compared to the second isolated scene signal.

4. The system of claim 2, wherein illuminating the scene with only the first individual light source includes repeatedly illuminating the scene with only the first individual light source, and
wherein illuminating the scene with only the second individual light source includes repeatedly illuminating the scene with only the second individual light source.

5. The system of claim 4, wherein the controller includes logic that, when executed by the controller, causes the system to perform operations including:
generating a composite video feed of the scene based on composite images of the scene illuminated by the first individual light source and the second individual light source.

6. The system of claim 2, wherein generating the video feed includes generating the first and second scene signals with the photodetector at an imaging frame rate, and wherein the imaging frame rate is greater than or equal to a frame rate of the video feed.

7. The system of claim 1, wherein an intensity of light output from an individual light source is greater when illuminating the scene with only the individual light source compared with an intensity of light output from the individual light sources when illuminating the scene with the plurality of light sources.

8. The system of claim 1, wherein the first individual light source is configured to emit light in a first wavelength range, and wherein the second individual light source is configured to emit light in a second wavelength range different from the first wavelength range.

9. The system of claim 1, further comprising an endoscope coupled to and configured to receive from the light engine and shaped to illuminate the scene with the illumination light.

10. A non-transitory, machine-readable storage medium having instructions stored thereon, which when executed by a processing system, cause the processing system to perform a method comprising:
repeatedly illuminating a scene with illumination light from a plurality of light sources;
generating video feed of the scene based on the scene illuminated by the illumination light;
illuminating the scene with only a first individual light source of the plurality of light sources between illuminating the scene with the plurality of light sources;
illuminating the scene with only a second individual light source of the plurality of light sources between illuminating the scene with the plurality of light sources;
generating a composite image of the scene based on the scene illuminated by only the individual light source and the scene illuminated by only the second individual light source; and
adjusting the composite image based upon user input.

11. The non-transitory, machine-readable storage medium of claim 10, the method further comprising:
generating a first isolated scene signal with a photodetector based upon the scene illuminated only by the first individual light source;
generating a second isolated scene signal with the photodetector based upon the scene illuminated only by the second individual light source;
generating a composite scene signal based upon the first isolated scene signal and the second isolated scene signal; and generating the composite image based upon the composite scene signal.

12. The non-transitory, machine-readable storage medium of claim 11, wherein adjusting the composite image includes adjusting a relative proportion of the first isolated scene signal compared to the second isolated scene signal.

13. The non-transitory, machine-readable storage medium of claim 11, wherein the first individual light source is configured to emit light in a first wavelength range, and wherein the second individual light source is configured to emit light in a second wavelength range different from the first wavelength range.

14. The non-transitory, machine-readable storage medium of claim 11, wherein illuminating the scene with only the first individual light source includes repeatedly illuminating the scene with only the first individual light source, and
wherein illuminating the scene with only the second individual light source includes repeatedly illuminating the scene with only the second individual light source.

15. The non-transitory, machine-readable storage medium of claim 14, generating a composite video feed of the scene based on composite images of the scene illuminated by the first individual light source and the second individual light source.

16. The non-transitory, machine-readable storage medium of claim 11, wherein generating the video feed includes generating the first and second scene signals with the photodetector at an imaging frame rate, and wherein the imaging frame rate is greater than or equal to a frame rate of the video feed.

17. The non-transitory, machine-readable storage medium of claim 10, wherein an intensity of light output from the an individual light source is greater when illuminating the scene with only the individual light sources compared with an intensity of light output from the individual light sources when illuminating the scene with the plurality of light sources.

18. A method for imaging a scene, the method comprising:
- repeatedly illuminating a scene with illumination light from a plurality of light sources;
- generating video feed of the scene based on the scene illuminated by the illumination light;
- illuminating the scene with only a first individual light source of the plurality of light sources between illuminating the scene with the plurality of light sources;
- illuminating the scene with only a second individual light source of the plurality of light sources between illuminating the scene with the plurality of light sources;
- generating a composite image of the scene based on the scene illuminated by only the first individual light source and the scene illuminated by only the second individual light source; and
- adjusting the composite image based upon input received from a user interface.

* * * * *